(12) United States Patent  
Yorikane et al.

(10) Patent No.: US 11,988,217 B2  
(45) Date of Patent: May 21, 2024

(54) OIL FEED TYPE AIR COMPRESSOR

(71) Applicant: Hitachi Industrial Equipment Systems Co., Ltd., Tokyo (JP)

(72) Inventors: Shigeyuki Yorikane, Tokyo (JP); Kenji Morita, Tokyo (JP); Yuta Kajie, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/022,635

(22) PCT Filed: Aug. 16, 2021

(86) PCT No.: PCT/JP2021/029876  
§ 371 (c)(1),  
(2) Date: Feb. 22, 2023

(87) PCT Pub. No.: WO2022/044863  
PCT Pub. Date: Mar. 3, 2022

(65) Prior Publication Data  
US 2023/0358248 A1 Nov. 9, 2023

(30) Foreign Application Priority Data  
Aug. 24, 2020 (JP) .................................. 2020-141020

(51) Int. Cl.  
*F04D 29/063* (2006.01)  
*F04D 27/00* (2006.01)  
*F16N 29/00* (2006.01)

(52) U.S. Cl.  
CPC ......... *F04D 29/063* (2013.01); *F04D 27/001* (2013.01); *F04D 27/009* (2013.01);  
(Continued)

(58) Field of Classification Search  
CPC .... F04C 29/02; F04C 29/021; F04C 2240/81; F04D 29/063; F04D 27/001;  
(Continued)

(56) References Cited

U.S. PATENT DOCUMENTS 11,181,110 B2 * 11/2021 Hebrard .................. F04C 29/02  
2005/0175492 A1 * 8/2005 Hirooka ................. F04C 29/026  
417/440  
(Continued)

FOREIGN PATENT DOCUMENTS

JP      1-280611 A    11/1989  
JP      2-26711 U     2/1990  
(Continued)

OTHER PUBLICATIONS

International Search Report (PCT/ISA/210) issued in PCT Application No. PCT/JP2021/029876 dated Sep. 28, 2021 with English translation (five (5) pages).

(Continued)

*Primary Examiner* — Courtney D Heinle  
*Assistant Examiner* — Andrew Thanh Bui  
(74) *Attorney, Agent, or Firm* — Crowell & Moring LLP

(57) ABSTRACT

Provided is an oil feed type air compressor which can increase the determination accuracy regarding a deterioration state of oil. An oil feed type air compressor 1 includes a compressor main body 3, a separator 6 that separates oil from compressed air discharged from the compressor main body 3, and an oil feeding system 8 that feeds the oil separated by the separator 6 into a compression chamber of the compressor main body 3. The oil feeding system 8 includes a temperature control valve 20 that adjusts a diversion ratio for an oil cooler 18 and a diversion ratio for a bypass pipe 19 according to a temperature of the oil. The oil feed type air compressor 1 includes pressure sensors 22A (Continued)

and 22B located in the oil feeding system 8, a discharge temperature sensor 11 located on the discharge side of the compressor main body 3, and a controller 9 that computes, when it is estimated that the diversion ratio for the oil cooler 18 is 100% from the temperature sensed by the discharge temperature sensor 11 exceeding a predetermined value Td1, a difference ΔP between the pressure sensed by the pressure sensor 22A and the pressure sensed by the pressure sensor 22B and determines a deterioration state of the oil in reference to the difference ΔP.

4 Claims, 4 Drawing Sheets

(52) U.S. Cl.
CPC .......... *F16N 29/00* (2013.01); *F16N 2210/16* (2013.01); *F16N 2250/04* (2013.01); *F16N 2250/08* (2013.01); *F16N 2270/50* (2013.01)

(58) Field of Classification Search
CPC .... F04D 27/009; F16N 29/00; F16N 2210/16; F16N 2250/04; F16N 2250/08; F16N 2270/50
See application file for complete search history.

(56) References Cited

U.S. PATENT DOCUMENTS

| | | | | |
|---|---|---|---|---|
| 2016/0370038 A1* | 12/2016 | Heo | .................. | B60H 1/00985 |
| 2019/0128249 A1* | 5/2019 | Oota | .................... | C10M 129/18 |
| 2020/0240415 A1* | 7/2020 | Kotani | .................... | F04B 49/20 |
| 2021/0156374 A1* | 5/2021 | Choi | .................. | F04B 39/0261 |

FOREIGN PATENT DOCUMENTS

| | | |
|---|---|---|
| JP | 2009-144685 A | 7/2009 |
| JP | 2014-152744 A | 8/2014 |
| JP | 2017-122585 A | 7/2017 |

OTHER PUBLICATIONS

Japanese-language Written Opinion (PCT/ISA/237) issued in PCT Application No. PCT/JP2021/029876 dated Sep. 28, 2021 (three (3) pages).

International Preliminary Report on Patentability (PCT/IB/338 & PCT/IB/373) issued in PCT Application No. PCT/JP2021/029876 dated Mar. 9, 2023, including English translation of document C2 (Japanese-language Written Opinion (PCT/ISA/237), filed on Feb. 22, 2023) (five (5) pages).

\* cited by examiner

OIL FEED TYPE AIR COMPRESSOR

TECHNICAL FIELD

The present invention relates to an oil feed type air compressor.

BACKGROUND ART

Patent Document 1 discloses an oil feed type air compressor. This oil feed type air compressor includes a compressor main body, a separator, and an oil feeding system. While injecting oil into a compression chamber in order to achieve sealing of the compression chamber, cooling of compression heat, lubrication of a rotor, and so forth, the compressor main body compresses air. The separator separates the oil from compressed air discharged from the compressor main body and reserves the oil.

The oil feeding system feeds the oil reserved in the separator to the compression chamber and so forth of the compressor main body. The oil feeding system includes an oil cooler that cools oil, a bypass pipe that bypasses the oil cooler, and a temperature control valve that adjusts a diversion ratio for the oil cooler and a diversion ratio for the bypass pipe according to the temperature of the oil.

Patent Document 2 discloses a technology for determining a deterioration state of oil that is used as lubricant, for example, for an engine of a vehicle. In Patent Document 2, a pressure difference sensor that senses a pressure difference between the upstream side and the downstream side of an oil distribution pipe is provided, and a viscosity of the oil is computed in reference to the pressure difference sensed by the pressure difference sensor. Then, the viscosity is compared with a threshold value set in advance to determine the deterioration rate of the oil.

PRIOR ART DOCUMENT

Patent Documents

Patent Document 1: JP-2009-144685-A
Patent Document 2: Japanese Utility Model Application No. Hei 02-026711

SUMMARY OF THE INVENTION

Problem to be Solved by the Invention

Oil used in the oil feed type air compressor is circulated between the compressor main body and the separator and is compressed together with air in the compressor main body. Deterioration of the oil progresses in association with the running rime of the compressor main body. Hence, generally the timing for replacement of the oil is set according to the running time of the compressor main body. However, since the condition of the progress of the deterioration of the oil changes depending upon the usage environment or the running load of the compressor machine body, it is preferable to change the timing for replacement of the oil.

Accordingly, it is possible to adopt the technology disclosed in Patent Document 2 to an oil feed type air compressor such that a deterioration state of oil is determined and the oil is replaced according to a result of the determination. In particular, for example, first and second pressure sensors for sensing each pressure on the upstream side and the downstream side in the oil feeding system, respectively, are provided, so that a difference between the pressure sensed by the first pressure sensor and the pressure sensed by the second pressure sensor is computed and then the deterioration state of the oil is determined in reference to the difference. Then, the oil is replaced according to the result of the determination.

However, a flow rate of the oil at the position of the first or second pressure sensor fluctuates according to the state of the temperature control valve described above, that is, according to the diversion ratio for the oil cooler and the diversion ratio for the bypass pipe. Details are described assuming, for example, a case in which the first and second pressure sensors are located on the downstream side with respect to a merging portion at which the oil from the oil cooler and the oil from the bypass pipe merge. Since the pressure loss of the oil cooler is larger than the pressure loss of the bypass pipe, as the diversion ratio for the oil cooler increases, the flow rate of the oil at the position of the first or second pressure sensor decreases. Along with this, also the difference between the pressure sensed by the first pressure sensor and the pressure sensed by the second pressure sensor fluctuates. Accordingly, the determination accuracy regarding the deterioration state of the oil becomes low.

The present invention has been made in view of such a situation as described above, and it is one of subjects of the present invention to increase the determination accuracy regarding the deterioration state of oil.

Means for Solving the Problem

In order to solve the subject described above, the configuration described in the claims is applied. Although the present invention includes a plurality of means for solving the subject described above, as one example of the means, there is provided an oil feed type air compressor including a compressor main body that compresses air while injecting oil into a compression chamber, a separator that separates the oil from compressed air discharged from the compressor main body, and an oil feeding system that feeds the oil separated by the separator into the compression chamber of the compressor main body, in which the oil feeding system includes an oil cooler that cools the oil, a bypass pipe that bypasses the oil cooler, and a temperature control valve that adjusts a diversion ratio for the oil cooler and a diversion ratio for the bypass pipe according to a temperature of the oil, and the oil feed type air compressor further includes a first pressure sensor that is located in the oil feeding system and senses a pressure of the oil, a second pressure sensor that is located on a downstream side of the first pressure sensor in the oil feeding system and senses a pressure of the oil, a temperature sensor that senses a temperature of the air on a discharge side or an intake side of the compressor main body, and a controller that computes, when it is estimated that the diversion ratio for the oil cooler is 100% and the diversion ratio for the bypass pipe is 0% from the temperature sensed by the temperature sensor exceeding a predetermined value, a difference between the pressure sensed by the first pressure sensor and the pressure sensed by the second pressure sensor and determines a deterioration state of the oil in reference to the difference.

Advantages of the Invention

According to the present invention, the determination accuracy regarding the deterioration state of oil can be increased.

It is to be noted that subjects, configurations, and advantages other than those described above will become apparent from the following description.

MODES FOR CARRYING OUT THE INVENTION

First Embodiment

Figure 1:
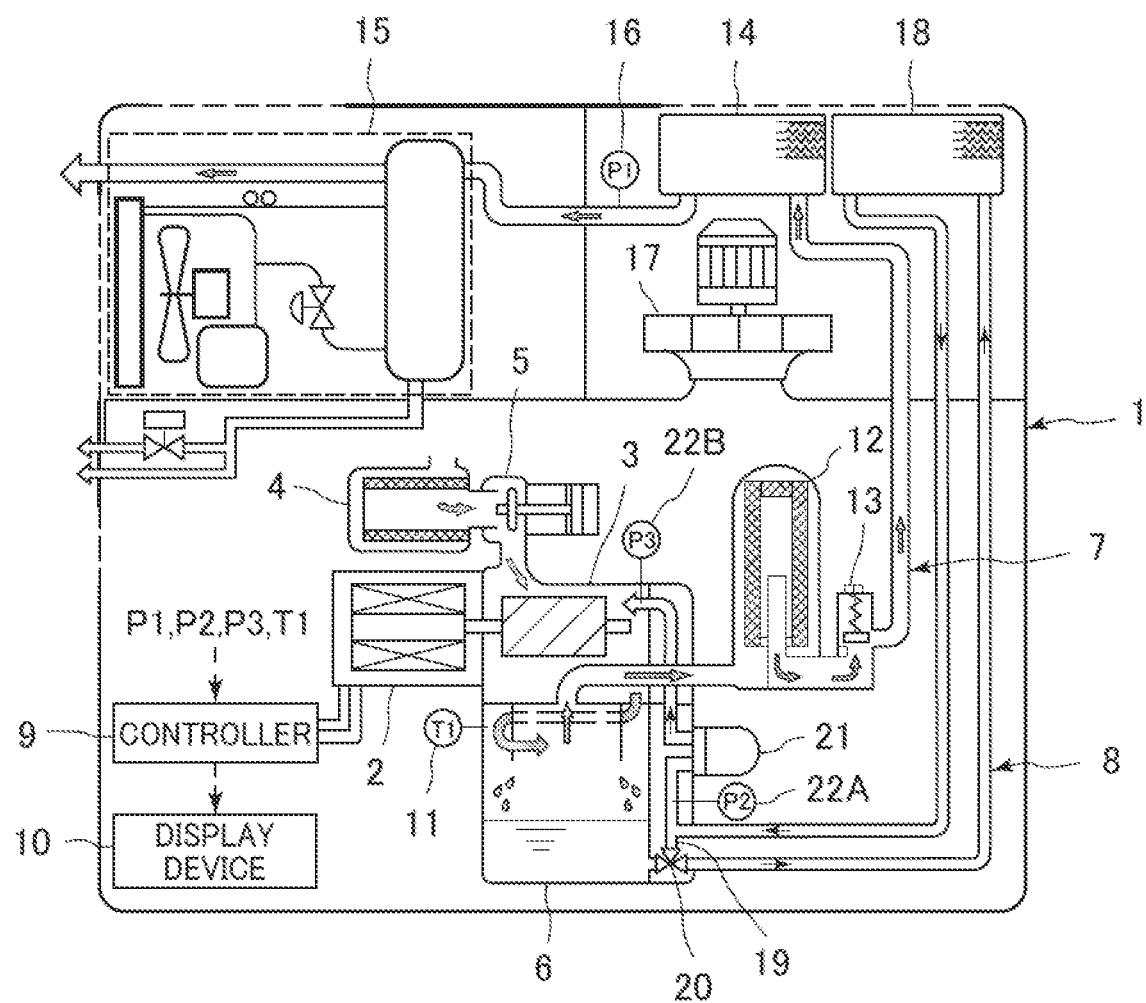
FIG. 1 is a schematic view depicting a configuration of an oil feed type air compressor according to a first embodiment of the present invention.
Figure 2:
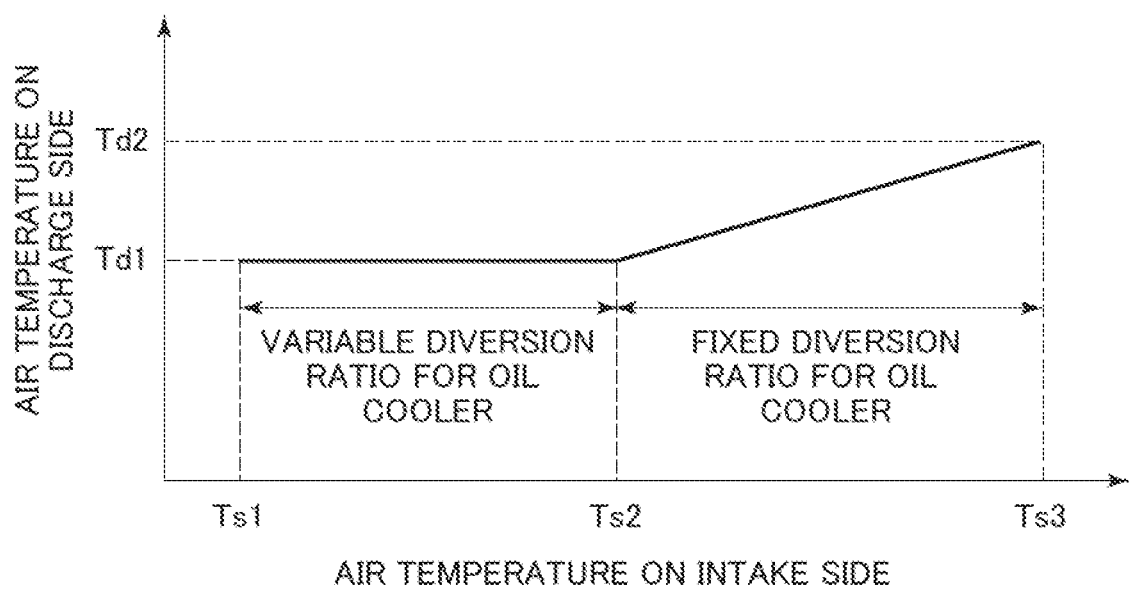
FIG. 2 is a diagram depicting a relation of a state of a temperature control valve with an air temperature on an intake side and an air temperature on a discharge side of a compressor main body in the first embodiment of the present invention.

A first embodiment of the present invention is described with reference to FIGS. 1 and 2. FIG. 1 is a view depicting a configuration of an oil feed type air compressor according to the present embodiment. FIG. 2 is a diagram depicting a relation of a state of a temperature control valve with an air temperature on the intake side and an air temperature on the discharge side of a compressor main body in the present embodiment.

An oil feed type air compressor 1 of the present embodiment includes an electric motor 2, a compressor main body 3 that is driven by the electric motor 2 to compress air, an intake filter 4 and an intake valve 5 provided on the intake side of the compressor main body 3, a separator 6 provided on the discharge side of the compressor main body 3, a compression air system 7 connected to an upper portion of the separator 6, an oil feeding system 8 connected to and between a lower portion of the separator 6 and the compressor main body 3, a controller 9, and a display device 10 (particularly, for example, a display or an indication lamp). It is to be noted that the oil feed type air compressor 1 is configured as a compressor unit in which the components described above are accommodated in a housing.

The compressor main body 3 has a pair of male and female screw rotors (in FIG. 1, only one of the screw rotors is depicted) that mesh with each other and a casing in which the screw rotors are accommodated. A plurality of compression chambers are formed in tooth grooves of the screw rotors. When the screw rotors are rotated by the electric motor 2, the compression chambers move in an axial direction of the rotors (in the rightward direction in FIG. 1). The compression chambers suck air through the intake filter 4 and the intake valve 5, compress the air, and discharge the compressed air to the separator 6. The compressor main body 3 injects oil into the compression chambers in order to achieve sealing of the compression chambers, cooling of compression heat, lubrication of the rotors, and so forth.

The separator 6 has a swirling flow path for swirling the compressed air that contains the oil, and primarily separates the oil from the compressed air by centrifugal separation and reserves the separated oil. In the inside of the separator 6, a discharge temperature sensor 11 for sensing a temperature T1 of the compressed air is provided.

The compression air system 7 supplies the compressed air separated by the separator 6 to the outside of the compressor. The compression air system 7 includes a separator element 12 that secondarily separates the oil from the compressed air by filtration separation, a pressure regulating check valve 13 located on the downstream side of the separator element 12, an after cooler 14 located on the downstream side of the pressure regulating check valve 13 and configured to cool the compressed air, a dryer 15 located on the downstream side of the after cooler 14 and configured to dehumidify the compressed air, and a discharge pressure sensor 16 located between the after cooler 14 and the dryer 15 and configured to sense a pressure P1 of the compressed air. The after cooler 14 cools the compressed air by heat exchange with cooling wind induced by a cooling fan 17.

The controller 9 includes, though not depicted, an arithmetic control section (for example, a CPU) that executes a computation process and a control process according to a program and a storage section (for example, a ROM or a RAM) that stores the program and a result of the computation process, for example. The controller 9 controls driving of the electric motor 2 in response to an operation of an unillustrated running switch or the like.

The controller 9 may variably control the speed of rotation of the electric motor 2 through an unillustrated inverter such that the pressure P1 sensed by the discharge pressure sensor 16 becomes a control target pressure. Further, the controller 9 may place, when the pressure P1 sensed by the discharge pressure sensor 16 rises to an upper limit pressure, the intake valve 5 into a closed state to perform switching to no-load running, and may place, when the pressure P1 sensed by the discharge pressure sensor 16 drops to a lower limit pressure, the intake valve 5 into an open state to perform switching to load running.

The oil feeding system 8 feeds the oil reserved in the separator 6 to the compression chambers and so forth of the compressor main body 3 according to the pressure difference between the separator 6 and the compressor main body 3. The oil feeding system 8 includes an oil cooler 18 that cools the oil, a bypass pipe 19 that bypasses the oil cooler 18, a temperature control valve 20 that adjusts a diversion ratio for the oil cooler 18 and a diversion ratio for the bypass pipe 19 according to the temperature of the oil, an oil filter 21 located on the downstream side of a merging portion at which the oil from the oil cooler 18 and the oil from the bypass pipe 19 merge and configured to remove impurities in the oil, a pressure sensor 22A located on the upstream side of the oil filter 21 (more particularly, on the downstream side of the merging portion described above) and configured to sense a pressure P2 of the oil, and a pressure sensor 22B located on the downstream side of the oil filter 21 and configured to sense a pressure P3 of the oil. The oil cooler 18 cools the oil by heat exchange with cooling wind induced by the cooling fan 17.

The temperature control valve 20 is a three-way valve and is configured such that, for example, the volume of wax changes according to the temperature of the oil to change the numerical aperture of the oil cooler side exit and the numerical aperture of the bypass pipe side exit. Further, in a case where the air temperature on the intake side of the compressor main body 3 falls within a predetermined range from Ts' to TS2 as depicted in FIG. 2, the temperature control valve 20 adjusts the diversion ratio for the oil cooler 18 and the diversion ratio for the bypass pipe 19 such that the air temperature on the discharge side of the compressor main body 3 comes to have a predetermined value Td1 (more particularly, a temperature equal to or higher than a drain generation limit temperature). When the air temperature on the intake side of the compressor main body 3 has a predetermined value Ts2, the diversion ratio for the oil cooler 18 is 100%, and the diversion ratio for the bypass pipe 19 is 0%.

In a case where the air temperature on the intake side of the compressor main body 3 exceeds the predetermined value Ts2, the diversion ratio for the oil cooler 18 is 100%, and the diversion ratio for the bypass pipe 19 is 0%, and the air temperature on the discharge side of the compressor main body 3 exceeds the predetermined value Td1. In this case, the air temperature on the discharge side of the compressor main body 3 rises according to a rise of the air temperature on the intake side of the compressor main body 3.

Here, as the most significant feature of the present embodiment, the controller 9 determines whether or not the temperature T1 sensed by the discharge temperature sensor 11 exceeds the predetermined value Td1, and estimates that, in a case where the temperature T1 sensed by the discharge temperature sensor 11 exceeds the predetermined value Td1, the diversion ratio for the oil cooler 18 is 100% and the diversion ratio for the bypass pipe 19 is 0%. At this time, the controller 9 computes a difference ΔP between the pressure P2 sensed by the pressure sensor 22A and the pressure P3 sensed by the pressure sensor 22B and determines a deterioration state of the oil in reference to the difference ΔP.

More particularly, the controller 9 computes a kinematic viscosity ν of the oil from the difference ΔP with use of, for example, an expression (1) given below. In the expression, A is a constant of proportion and has a value that changes depending upon the length or the inner diameter of a pipe between the pressure sensors 22A and 22B. In the expression, Q is a flow rate of the oil at the position of the pressure sensor 22A or 22B and is a value at the time when the diversion ratio for the oil cooler 18 is 100% and the diversion ratio for the bypass pipe 19 is 0%. In the expression, ρ is a concentration of the oil. The controller 9 has stored therein a relation between the temperature and the concentration of the oil and obtains, since the temperature of the compressed air sensed by the discharge temperature sensor 11 is substantially equal to the temperature of the oil, the concentration ρ of the oil corresponding to this temperature.

[Expression 1]

$$v = A \times \left( \frac{\Delta P}{\rho \times Q} \right) \quad (1)$$

The controller 9 compares the kinematic viscosity ν computed using the expression (1) above with a threshold value set in advance, to determine a deterioration state of the oil. Further, in a case where the kinematic viscosity ν is equal to or higher than the threshold value, for example, the controller 9 outputs a displaying command to the display device 10 such that a message for prompting replacement of the oil is displayed on the display or the indication lamp is turned on.

In this manner, in the present embodiment, it is possible to compute the difference ΔP between the pressure P2 sensed by the pressure sensor 22A and the pressure P3 sensed by the pressure sensor 22B and determine a deterioration state of the oil in reference to the difference ΔP. Further, under such a condition that the temperature sensed by the discharge temperature sensor 11 exceeds the predetermined value Td1, that is, under such a condition that the diversion ratio for the oil cooler 18 is 100% and the diversion ratio for the bypass pipe 19 is 0% and that the flow rate of the oil at the position of the pressure sensor 22A or 22B does not fluctuate, the computation and the determination described above are performed. Hence, the determination accuracy regarding the deterioration state of the oil can be increased.

Second Embodiment

Figure 3:
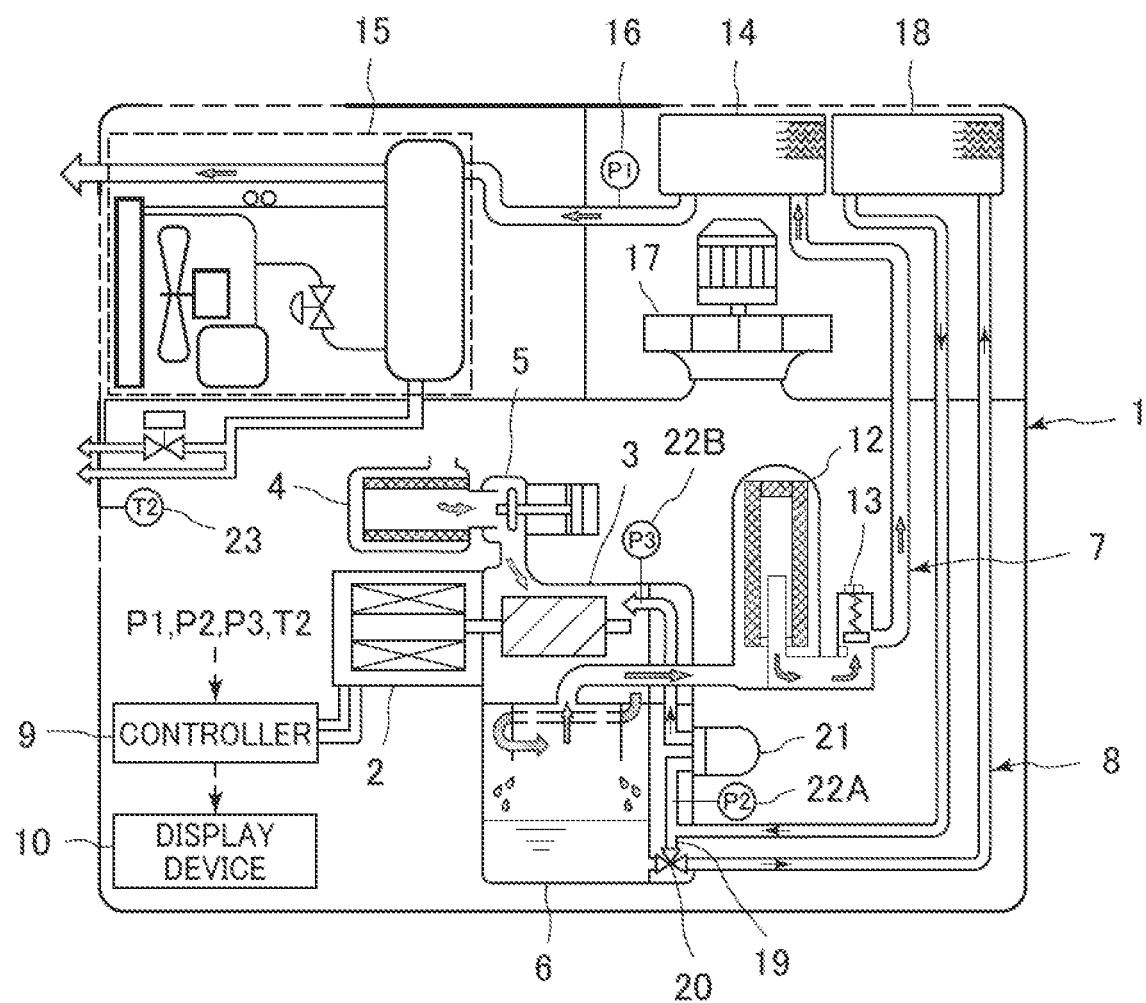
FIG. 3 is a schematic view depicting a configuration of an oil feed type air compressor according to a second embodiment of the present invention.

A second embodiment of the present invention is described with reference to FIG. 3. FIG. 3 is a view depicting a configuration of an oil feed type air compressor in the present embodiment. It is to be noted that, in the present embodiment, elements similar to those in the first embodiment are denoted by identical reference characters and description of them is omitted suitably.

The oil feed type air compressor 1 of the present embodiment includes an intake temperature sensor (atmospheric air temperature sensor) 23 for sensing a temperature T2 of air on the intake side of the compressor main body 3.

The controller 9 in the present embodiment determines whether or not the temperature T2 sensed by the intake temperature sensor 23 exceeds the predetermined value Ts2 (refer to FIG. 2 described hereinabove) and estimates, in a case where the temperature T2 sensed by the intake temperature sensor 23 exceeds the predetermined value Ts2, that the diversion ratio for the oil cooler 18 is 100% and the diversion ratio for the bypass pipe 19 is 0%. At this time, the controller 9 calculates the difference ΔP between the pressure P2 sensed by the pressure sensor 22A and the pressure P3 sensed by the pressure sensor 22B and determines a deterioration state of the oil in reference to the difference ΔP.

More particularly, the controller 9 computes the kinematic viscosity ν of the oil from the difference ΔP, for example, with use of the expression (1) given hereinabove. It is to be noted that the controller 9 has stored therein a relation between the temperature and the concentration of the oil and a relation between the temperature of air on the intake side and the temperature of the compressed air on the discharge side of the compressor main body 3, and obtains the temperature of the compressed air on the discharge side from the temperature sensed by the intake temperature sensor 23. Further, since the temperature of the compressed air and the temperature of the oil are substantially equal to each other, the controller 9 obtains the concentration p of the oil corresponding to this temperature of the oil.

The controller 9 compares the kinematic viscosity ν calculated using the expression (1) given hereinabove with a threshold value set in advance, to determine a deterioration state of the oil. Further, in a case where the kinematic viscosity ν is equal to or higher than the threshold value, the controller 9 outputs, for example, a displaying command to the display device 10 such that a message for prompting replacement of the oil is displayed on the display or the indication lamp is turned on.

In this manner, in the present embodiment, it is possible to compute the difference ΔP between the pressure P2 sensed by the pressure sensor 22A and the pressure P3 sensed by the pressure sensor 22B and determine the deterioration state of the oil in reference to the difference ΔP. Further, under such a condition that the temperature T2 sensed by the intake temperature sensor 23 exceeds the predetermined value Ts2, that is, under such a condition that the diversion ratio for the oil cooler 18 is 100% and the diversion ratio for the bypass pipe 19 is 0% and that the flow rate of the oil at the position of the pressure sensor 22A or 22B does not fluctuate, the computation and the determination described above are performed. Hence, the determination accuracy regarding the deterioration state of the oil can be increased.

It is to be noted that, although the first and second embodiments are described above taking the case in which the controller 9 compares the kinematic viscosity ν of the oil computed in reference to the difference ΔP in pressure with a threshold value that is fixed irrespective of the temperature of the oil as an example, this is not restrictive. For example, the controller 9 may otherwise compare the kinematic viscosity ν of the oil computed in reference to the difference ΔP in pressure with a threshold value that is made variable according to the temperature of the oil, to determine the deterioration state of the oil.

Further, although the first and second embodiments are described taking the case in which the controller 9 computes the kinematic viscosity ν of the oil in reference to the difference ΔP in pressure as an example, this is not restrictive. For example, the controller 9 may compare the difference ΔP in pressure with a threshold value that is fixed irrespective of the temperature of the oil, to determine the deterioration state of the oil. Alternatively, for example, the controller 9 may compare the difference ΔP in pressure with a threshold value that is made variable according to the temperature of the oil, to determine the deterioration state of the oil.

Figure 4:
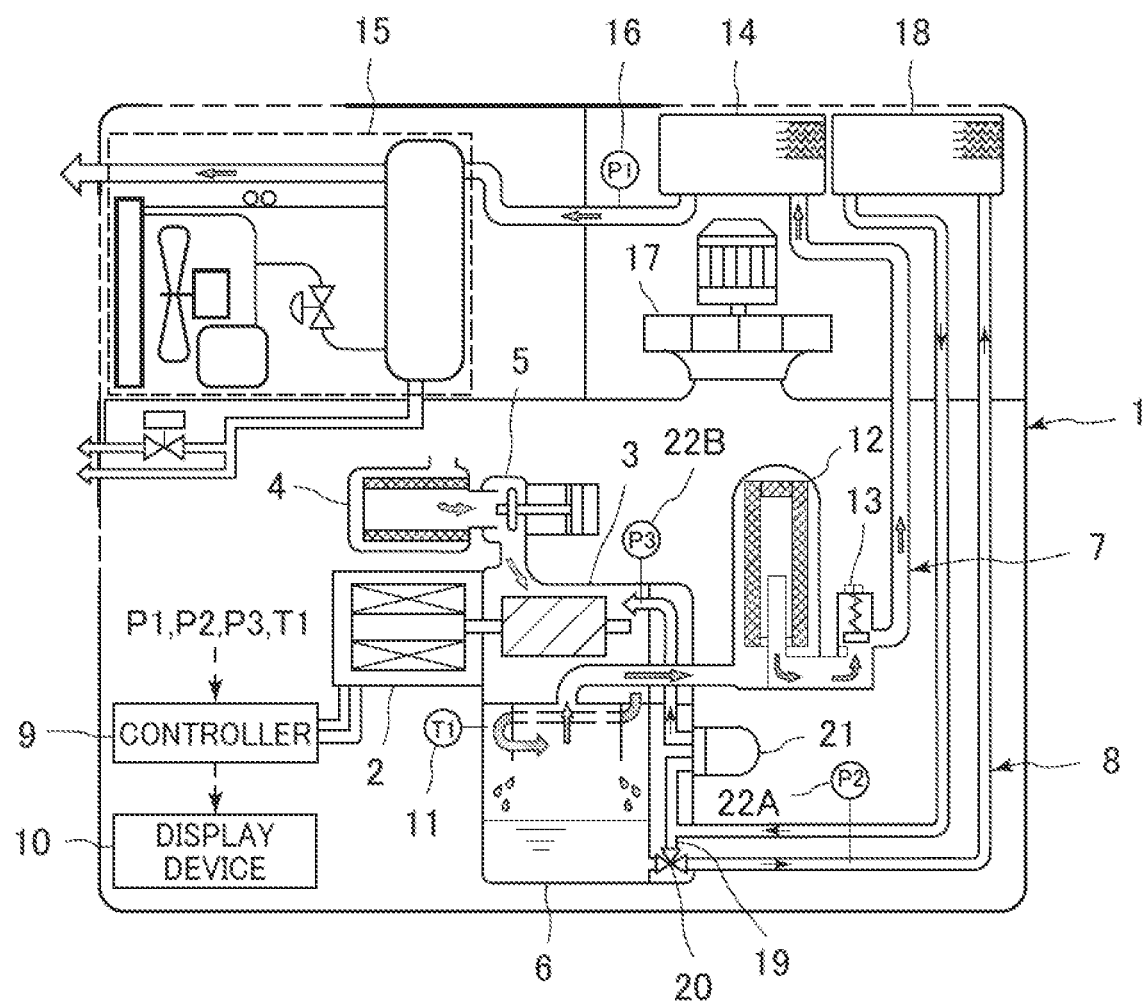
FIG. 4 is a schematic view depicting a configuration of an oil feed type air compressor according to a modification of the present invention.

Further, although the first and second embodiments are described taking the case in which the pressure sensor 22A is located on the upstream side of the oil filter 21 (more particularly, on the downstream side with respect to the merging portion at which the oil from the oil cooler 18 and the oil from the bypass pipe 19 merge) while the pressure sensor 22B is located on the downstream side of the oil filter 21 as an example, this is not restrictive. For example, as in a modification depicted in FIG. 4, the pressure sensor 22A may be located on the upstream side of the oil cooler 18 (more particularly, on the downstream side with respect to a diverging portion at which the oil diverges to the oil cooler 18 and the bypass pipe 19).

Further, although the first and second embodiments are described taking the case in which the compressor main body 3 is of the screw rotor type and includes the pair of male and female screw rotors as an example, this is not restrictive. The compressor main body may otherwise include a single screw rotor and a plurality of gate rotors. Further, the compressor main body may be of a volume type other than the screw rotor type (more particularly, of a tooth type or a reciprocation type) or may be of a turbo type.

DESCRIPTION OF REFERENCE CHARACTERS

1: Oil feed type air compressor
3: Compressor main body
6: Separator
8: Oil feeding system
9: Controller
10: Display device
11: Discharge temperature sensor
18: Oil cooler
19: Bypass pipe
20: Temperature control valve
21: Oil filter
22A, 22B: Pressure sensor
23: Intake temperature sensor

The invention claimed is:

1. An oil feed type air compressor comprising:
a compressor main body that compresses air while injecting oil into a compression chamber;
a separator that separates the oil from compressed air discharged from the compressor main body; and
an oil feeding system that feeds the oil separated by the separator into the compression chamber of the compressor main body, wherein
the oil feeding system includes an oil cooler that cools the oil, a bypass pipe that bypasses the oil cooler, and a temperature control valve that adjusts a diversion ratio for the oil cooler and a diversion ratio for the bypass pipe according to a temperature of the oil, and
the oil feed type air compressor further includes
a first pressure sensor that is located in the oil feeding system and senses a pressure of the oil,
a second pressure sensor that is located on a downstream side of the first pressure sensor in the oil feeding system and senses a pressure of the oil,
a temperature sensor that senses a temperature of the air on a discharge side or an intake side of the compressor main body, and
a controller that computes, when it is estimated that the diversion ratio for the oil cooler is 100% and the diversion ratio for the bypass pipe is 0% from the temperature sensed by the temperature sensor exceeding a predetermined value, a difference between the pressure sensed by the first pressure sensor and the pressure sensed by the second pressure sensor and determines a deterioration state of the oil in reference to the difference.

2. The oil feed type air compressor according to claim 1, wherein
the oil feeding system includes an oil filter that removes impurities in the oil,
the first pressure sensor is located on an upstream side of the oil filter, and
the second pressure sensor is located on a downstream side of the oil filter.

3. The oil feed type air compressor according to claim 1, wherein
the oil feeding system includes an oil filter that is located on a downstream side of a merging portion at which the oil from the oil cooler and the oil from the bypass pipe merge, and removes impurities in the oil,
the first pressure sensor is located on an upstream side of the oil cooler, and
the second pressure sensor is located on a downstream side of the oil filter.

4. The oil feed type air compressor according to claim 1, further comprising:
a display device that displays the deterioration state of the oil determined by the controller.

* * * * *